United States Patent
Chung

(10) Patent No.: US 9,660,433 B2
(45) Date of Patent: May 23, 2017

(54) ACTIVE LIGHTNING ARRESTER

(71) Applicant: Young-Ki Chung, Seoul (KR)

(72) Inventor: Young-Ki Chung, Seoul (KR)

(*) Notice: Subject to any disclaimer, the term of this patent is extended or adjusted under 35 U.S.C. 154(b) by 165 days.

(21) Appl. No.: 14/732,180

(22) Filed: Jun. 5, 2015

(65) Prior Publication Data
US 2015/0364907 A1   Dec. 17, 2015

(30) Foreign Application Priority Data

Jun. 13, 2014 (KR) .................. 10-2014-0072156

(51) Int. Cl.
*H02G 13/00* (2006.01)

(52) U.S. Cl.
CPC ............. *H02G 13/80* (2013.01); *H02G 13/20* (2013.01)

(58) Field of Classification Search
CPC ............................... H02G 13/80; H02G 13/20
See application file for complete search history.

(56) References Cited

U.S. PATENT DOCUMENTS

| | | | | |
|---|---|---|---|---|
| 3,350,496 A * | 10/1967 | Ritter | ...................... | H02G 13/00 174/4 C |
| 4,480,146 A * | 10/1984 | Invernizzi | ............... | H02G 13/00 174/3 |
| 4,518,816 A * | 5/1985 | Robert | ................... | H02G 13/00 174/3 |
| 4,728,748 A * | 3/1988 | Robert | ................... | H02G 13/00 174/3 |
| 5,638,248 A | 6/1997 | Fawthrop | | |
| 6,320,119 B1 * | 11/2001 | Gumley | ................. | H02G 13/00 174/3 |
| 6,875,915 B1 | 4/2005 | Chung | | |
| 6,943,285 B2 | 9/2005 | Chung | | |
| 7,495,168 B2 * | 2/2009 | Park | ....................... | H02G 13/00 174/3 |

(Continued)

FOREIGN PATENT DOCUMENTS

| KR | 10-2004-0040512 | 5/2004 |
|---|---|---|
| KR | 10-0440616 | 7/2004 |

*Primary Examiner* — Scott Bauer
(74) *Attorney, Agent, or Firm* — Blank Rome LLP

(57) ABSTRACT

The present invention relates to an arrester, comprising: a rod member coupled to a ground means at one end in the longitudinal direction and charged with charges of the ground; a plurality of insulators provided to be spaced from each other in the longitudinal direction of the rod member; an charging plates provided between the neighboring insulators separately from the rod member so as to be electrically insulated and charged with a polarity opposite to that of the charges of the ground; a charging tube provided between the charging plates and the insulators, electrically connected to the charging plates, and charged with charges having a polarity opposite to that of the charges of the ground; a needle electrode member provided to the upper end of the rod member and having a needle-shaped part; and a discharge induction conductor electrode electrically connected to the charging plates between the insulators and the charging plates so as to induce discharge between the needle electrode member and the discharge induction conductor electrode and emit ion charges through the discharge, thereby forming a discharge path between a thundercloud and the needle electrode.

7 Claims, 4 Drawing Sheets

(56) References Cited

U.S. PATENT DOCUMENTS

| | | | |
|---|---|---|---|
| 7,902,455 B2* | 3/2011 | Chung | H02G 13/00 174/2 |
| 8,451,575 B2* | 5/2013 | Chung | H02G 13/00 361/117 |
| 9,166,391 B1* | 10/2015 | Bean | H02G 13/00 |

* cited by examiner (Embodiment 1)

(Embodiment 2)

(Reference example 1)

(Reference example 2)

ACTIVE LIGHTNING ARRESTER

BACKGROUND OF THE INVENTION

Field of the Invention

The present invention relates to an arrester and, more specifically, to an active lightning arrester for actively and quickly receiving lightning and safely discharging the charges of a thundercloud to the ground, thereby reducing the lightning frequency with respect to a protection object.

Background Art

In general, an arrester is provided to the uppermost end part of a building so as to safely discharge the charges accumulated in a thundercloud to the ground by forming a discharge path between the thundercloud and the ground.

In a fine day, the electric field of the ground is, in general, about 100V/m. However, if a thundercloud approaches, the electric field of the ground becomes about 10,000V/m and the potential difference between the thundercloud and the ground reaches one hundred million V.

However, if the charges filled in the thundercloud is equal to or less than a predetermined size or if a predetermined distance is maintained between the ground and the thundercloud, the air of the atmospheric layer serves as a good insulator such that no dielectric breakdown, that is, no lightning is generated between the ground and the thundercloud. However, the charges of a predetermined size or more filled in the thundercloud can break the insulation of the atmospheric layer whenever discharge conditions such as the distance, humidity and the like are satisfied between the ground and the thundercloud such that the charges of the thundercloud are discharged to the ground, thereby remaining the danger of lightning all the time.

Further, due to the recent tendency towards the high-rise and high-density buildings, a distance from a thundercloud and lightning to a building to be protected becomes decreased. Therefore, the present inventor has developed and suggested to protect a building by leading lightning into a stone needle part of an arrester as disclosed in U.S. Pat. No. 6,943,285, Korean Patent Laid-Open Publication No. 2004-0040512 and Korean Patent No. 0440616. However, when a building is protected by leading the lightning into the stone needle part of an arrester according to the prior art, the lightning can be leaded as intended in some cases. However, depending on natural conditions, an charging voltage between a building to be protected and a thundercloud and lightning becomes lower than an insulation breakdown voltage between the thundercloud and the stone needle part of the arrester of the building to be protected and thus the charges of the thundercloud can be discharged through any other conductors which are fixed and provided to the upper end portion of the building to be protected rather than the arrester. Therefore, the lightning is likely to hit the structures rather than to be leaded into the lightning arrester.

Further, the prior art has a further disadvantage that electric performance becomes deteriorated by the generation of rust since constituent elements except insulators are made from metal materials such as copper, steel and the like. In addition, in a region such as an industrial complex, a costal area and the like, where the concentration of salt, sulfurous acid and the like which can induce the corrosion of metal is relatively high, the corrosion rapidly progresses, thereby decreasing the mechanical strength and resulting in damage from external force such as strong wind, vibration and the like.

Furthermore, the prior art has still another disadvantage in conveying, installation and the like since the arrester mainly made from metal materials is a considerably heavy body which weighs several kilometers to scores of kilometers.

PRIOR ART DOCUMENT

Patent Document

Patent Document 1: U.S. Pat. No. 5,638,248 (10 Jun. 1997)

Patent Document 2: Korean Patent Laid-Open Publication No. 2004-0040512 (13 May 2004)

Patent Document 3: Korean Patent Publication No. 0440616 (6 Jul. 2004)

SUMMARY OF THE INVENTION

Accordingly, the present invention has been made to solve the above-mentioned problems occurring in the prior arts, and it is an objective of the present invention to provide an active lightning arrester, wherein a discharge path is formed between a thundercloud and earth so as to more effectively and safely discharge the charges of the thundercloud to the ground in a rapid and active manner, thereby protecting a protection object to avoid the lightning.

To accomplish the above objectives, according to the present invention, an active lightning arrester, comprises: a fixing plate provided to the uppermost end part of a protection object and connected to a ground means; a rod member coupled to the ground means at one end in the longitudinal direction and charged with the charges of the ground; a plurality of insulators provided to be spaced from each other in the longitudinal direction of the rod member; charging plates provided between the neighboring insulators separately from the rod member so as to be electrically insulated and charged with a polarity opposite to that of the charges of the ground; a charging tube provided between the charging plates and the insulators, electrically connected to the charging plates, and charged with charges having a polarity opposite to that of the charges of the ground; a needle electrode member provided to the upper end of the rod member and having a needle-shaped part; and a discharge induction conductor electrode electrically connected to the charging plates between the insulators and the charging plates so as to induce discharge between the needle electrode member and the discharge induction conductor electrode and emit ion charges through the discharge to atmosphere, thereby forming a discharge path between a thundercloud and the needle electrode.

According to the present invention, the materials of the rod member, the charging plates, the charging tube, the needle electrode member and the discharge induction conductor electrode can be carbon or graphite, or the materials of any one of the rod member, the charging plates, the charging tube, the needle electrode member and the discharge induction conductor electrode can be carbon or graphite.

The discharge induction conductor electrode is divided into two parts, of which one is to be a first discharge induction conductor electrode extending upwards and the other end is to be a second discharge induction conductor electrode folded downwards and positioned in the proximity of the end portion of the needle-shaped part of the needle electrode member.

A gap between the end portion of the needle electrode member and the end portion of the second discharge induction conductor electrode is within the range of 9~13 mm.

The insulators include an upper insulator provided at the upper portion of the charging tube so as to secure an insulation distance with respect to the needle electrode member, and a lower insulator provided at the lower portion of the charging tube so as to secure an insulation distance with respect to the fixing plate and having an insulating protrusion formed at the upper end of the lower insulator so as to be inserted into the charging tube.

The insulating protrusion has a structure, in which a plurality of conical members having narrow upper portions and wide lower portions are continuously connected on a same line.

According to the present invention as described above, as a thundercloud having a high lightning possibility approaches, a discharge path is formed between the thundercloud and the ground in a rapid and active manner so as to more effectively and safely discharge the charges of the thundercloud to the ground, thereby safely protecting a protection object.

In particular, according to the electric dipole principle, the upper charges collected by an insulation cap are enabled to carry out leading discharge with an uppermost arrester shaft such that the main discharge of the lightning can be rapidly and actively induced into a lightning rod and prevent the introduction of the lightning into any other structure, thereby minimizing the damage to a protection object and enabling the damage prevention resulting from corrosion and the weight-lightening.

DETAILED DESCRIPTION OF THE PREFERRED EMBODIMENT

Reference will be now made in detail to the preferred embodiments of the present invention with reference to the attached drawings.

Figure 1:
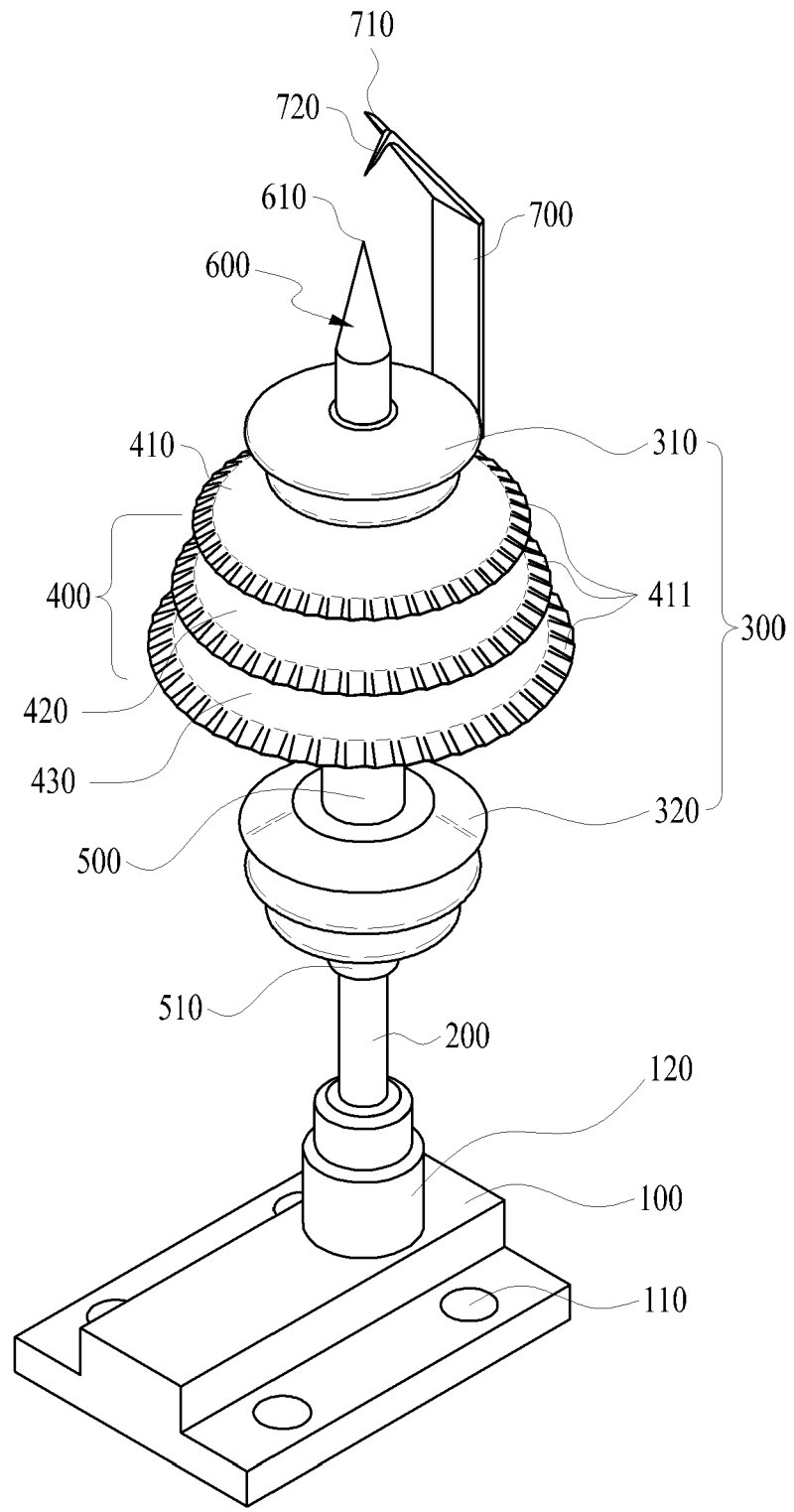
FIG. 1 is a perspective view showing an active lightning arrester according to a preferred embodiment of the present invention.
Figure 2:
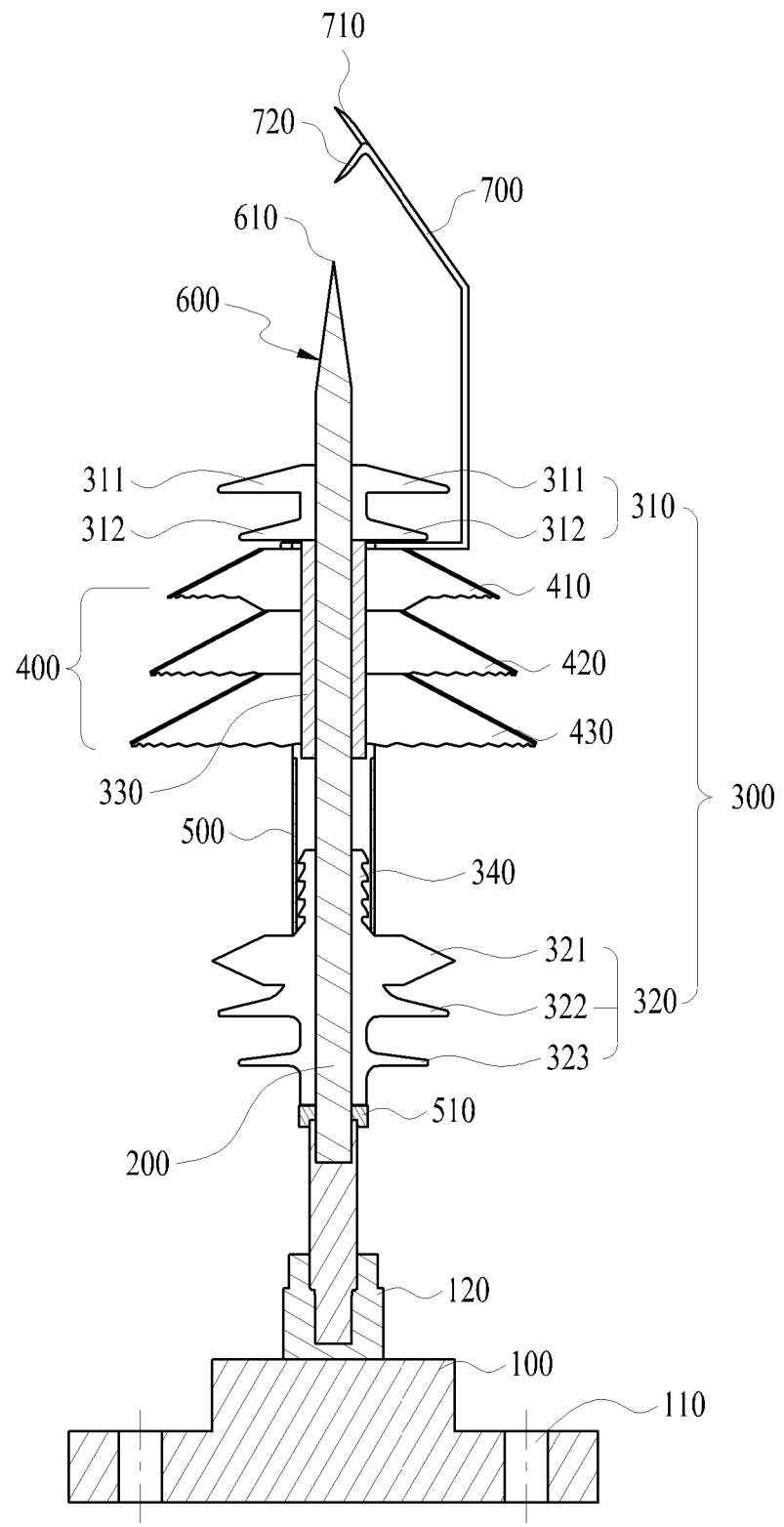
FIG. 2 is a cross sectional view showing the active lightning arrester of FIG. 1.
Figure 3:
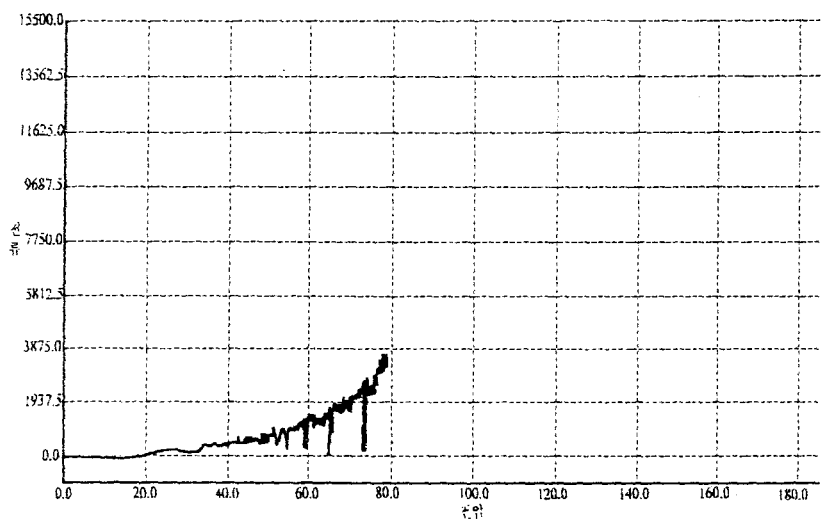
FIG. 3 is a graph showing the relation between the corona discharge current of the active lightning arrester and voltages by using a testing device according to the present invention.
Figure 3:
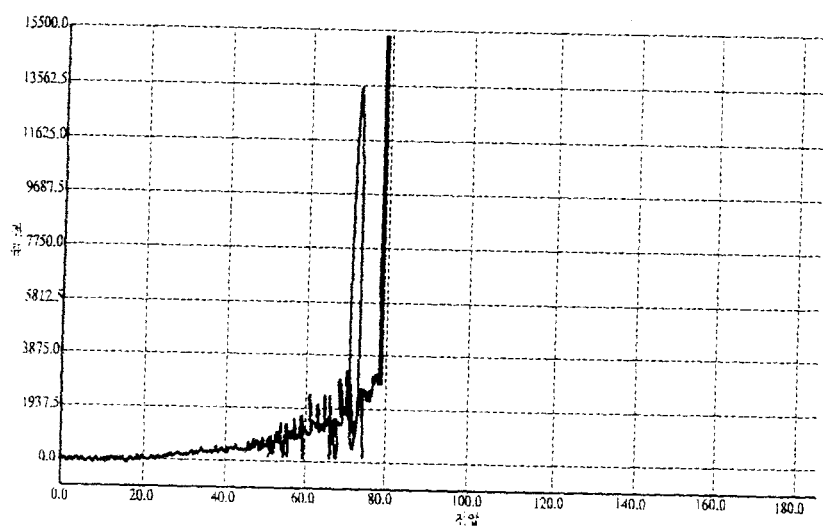

Referring to FIG. 1 to FIG. 3, an active lightning arrester according to a preferred embodiment of the present invention includes a fixing plate 100 provided to the uppermost end part of a protection object and connected to a ground means, a rod member 200 coupled to the fixing plate 100 at one end and charged with the charges of the ground, at least two or more insulators 300 (for electrical insulation, called as porcelain insulators, polymer insulators and the like according to the main materials thereof, and hereon commonly referred as "polymer insulators") provided to be spaced from each other in the longitudinal direction of the rod member 200, a plurality of charging plates 400 provided between the neighboring polymer insulators 300 separately from the rod member 200 so as to be electrically insulated and have a polarity opposite to that of the charges of the ground and charged with charges, a charging tube 500 provided between the charging plates 400 and the polymer insulators 300 at the lower side adjacent to the fixing plate 100, electrically connected to the charging plates 400, and charged with charges having a polarity opposite to that of the charges of the ground, a needle electrode member 600 coupled to the upper end of the rod member 200 and leading lightning, and a discharge induction conductor electrode 700 electrically connected to the charging plates 400 and the charging tube 500 and facing the needle electrode member 600 at a predetermined interval from the needle electrode member 600.

First, the fixing plate 100 is provided to an outdoor position on a top floor and connected to the ground means and serves to stably fix the rod member 200.

Such the fixing plate 100 is a flat plate type member having a predetermined thickness, and includes a plurality of coupling holes 110 which are formed in the surface thereof so as to be stably fixed to the ground surface or a building structure to be a protection object by screw-coupling, and a coupling member 120 which protrudes from the fixing plate 100 for the screw-coupling with the rod member 200.

The rod member 200 is a constituent element, which is coupled to the coupling member 120 of the fixing plate 100 at one end thereof in the longitudinal direction and vertically stands with respect to the ground surface so as to be charged with the charges of the ground.

Further, the polymer insulators 300 are respectively provided at the upper portion and the lower portion with respect to the rod member 200 so as to be spaced from each other, and made from ceramic materials or synthetic resin materials so as to insulate the rod member 200, the charging plates 400 and the charging tube 500 mentioned below.

Herein, the polymer insulators 300 include an upper polymer insulator 310 provided at the upper portion with reference to the charging tube 500 so as to secure an insulation distance with respect to the needle electrode member 600 and a lower polymer insulator 320 provided at the lower portion with reference to the charging tube 500 so as to secure an insulation distance with respect to the fixing plate 100. At this time, the upper polymer insulator 310 has an insulating tube 330 formed at the lower end thereof so as to be penetrated by the rod member 200 in the central direction, and the lower polymer insulator 320 has an insulating protrusion 340 formed at the upper end thereof so as to be inserted into the charging tube 500.

At this time, the insulating tube 330 can be formed to be integrated into the lower end of upper polymer insulator 310 or to be separate therefrom.

The upper polymer insulator 310 has a plurality of extension pieces 311, 312 which extend outwardly and are spaced from each other at a predetermined distance so as to secure an insulation distance from the needle electrode member 600. Meanwhile, the lower polymer insulator 320 has a plurality of extension pieces 321, 322, 323 which extend outwardly and are spaced from each other at predetermined distances, thereby securing an insulation distance from upper polymer insulator 310 and the fixing plate 100.

In particular, the insulating protrusion 340 provided to the lower polymer insulator 320 has a predetermined length such that the insulating protrusion 340 guides introduced rainwater to be readily discharged to the outside of the rod member 200 and, simultaneously, sufficiently secures an insulating distance between the charging tube 500 and the rod member 200 when the rainwater is introduced into the charging tube 500 by the influence of wind.

To this end, the insulating protrusion 340 is formed of a structure, in which a plurality of conical members each having a narrow upper portion and a wide lower portion are continuously connected on a same line.

Furthermore, the charging plates 400 are provided between the upper polymer insulator 310 and the lower polymer insulator 320 so as to maintain the electrically insulated state with respect to the rod member 200 while being electrically connected to the charging tube 500. The charging plates 400 are constituent elements, which are maintained in an electrically insulated state from the rod member 200 while being electrically connected to the charging tube 500 and are charged with a polarity opposite from that of the charges of the ground, wherein the charging plates 400 include a plurality of first to third charging plates 410, 420, 430.

In addition, the first to third charging plates 410, 420, 430 have corrugations 411, which are repetitively formed along the circumferential rims thereof.

The corrugations 411 are provided so as to induce uniformly distributed discharges and secure sufficient charging areas in the circumferential direction of the first to third charging plates 410, 420, 430.

The first to the third charging plates 410, 420, 430 are charged by a thundercloud when the thundercloud approaches, and supply the charged charges to the charging tube 500 and the discharge induction conductor electrode 700, which are electrically connected to the first to the third charging plates 410, 420, 430. Therefore, the first to the third charging plates 410, 420, 430 promote the generation of leading discharge between the charging tube 500 and the rod member 200 and between the discharge induction conductor electrode 700 and the needle electrode member 600.

Further, the charging tube 500 is a constituent element, which is provided between the charging plates 400 and the lower polymer insulator 320 and is electrically connected to the charging plates 400 so as to be charged with charges having a polarity opposite to that of the charges of the ground.

Herein, the charging tube 500 is formed in a tubular shape so as to be coupled with the rod member 200 as the rod member 200 penetrates the center portion of the charging tube 500.

Further, the rod member 200 is provided with a support body 510 for supporting the charging tube 500 and the lower polymer insulator 320.

The needle electrode member 600 is a constituent element, which is provided to the uppermost end part of the rod member 200 so as to directly lead lightning when the lightning is generated by the approaching of a thundercloud, wherein the needle electrode member 600 is provided with a needle-shaped part 610, which is formed of a predetermined length in a conical shape and has a sharp tip portion.

In addition, the discharge induction conductor electrode 700 is connected between the upper polymer insulator 310 and the charging plates 400 and extends in the upward direction. The discharge induction conductor electrode 700 is divided into two parts for the leading discharges together with the needle-shaped part 610, of which one is to be a first discharge induction conductor electrode 710 extending in the upward direction and the other one is to be a second discharge induction conductor electrode 720 folded in the downward direction and positioned in the proximity of the end portion of the needle-shaped part 610 of the needle electrode member 600.

Herein, the discharge induction conductor electrode 700 is provided at the upper side of the rod member 200 and electrically connected to the charging plates 400, wherein any other portion of the discharge induction conductor electrode 700 except the first discharge induction conductor electrode 710 and the second discharge induction conductor electrode 720 can be formed as a conductor which is insulatedly coated, a metal conductor which is not insulatedly coated and made from a metal material such as copper (Cu) and the like, or a nonmetal conductor made from carbon and the like.

The first discharge induction conductor electrode 710 of the discharge induction conductor electrode 700, which extends in the upward direction, is to promote the charging by a thundercloud, while the second discharge induction conductor electrode 720 which is folded in the downward direction and positioned in the proximity of the end portion of the needle-shaped part 610 of the needle electrode member 600, is to promote the leading discharge together with the needle electrode member 600.

At this time, an insulation breakdown voltage and the discharge current depend on the interval between the end portion of the second discharge induction conductor electrode 720 and the end portion of the needle electrode member 600.

In the present invention, even though each of the needle electrode member 600, the rod member 200 and the fixing plate 100 is described as an individual constituent element but not limited thereto and can be integrally formed together.

According to the present invention, as shown in FIG. 3 with reference to embodiment 1, if the interval between the end portion of the second discharge induction conductor electrode 720 and the end portion of the needle electrode member 600 is 13 mm, the insulation breakdown voltage is 84 kV and the discharge current is approximately 4900 A. Further, as shown in FIG. 3 with reference to embodiment 2, if the interval between the end portion of the second discharge induction conductor electrode 720 and the end portion of the needle electrode member 600 becomes relatively reduced to 9 mm, the insulation breakdown voltage is still 84 kV without any change but the discharge current becomes decreased to approximately 3100 A.

Figure 4:
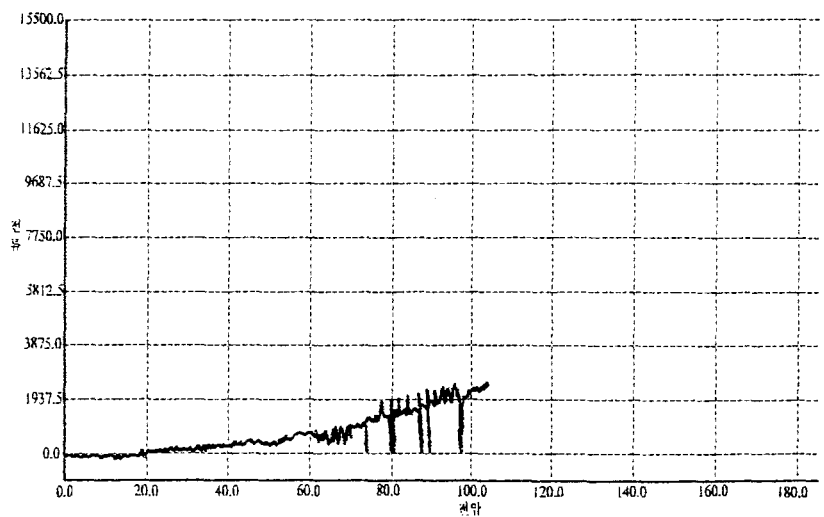
FIG. 4 is a graph showing the relation between the corona discharge current of a lightning arrester and voltages by using a prior art testing device.
Figure 4:
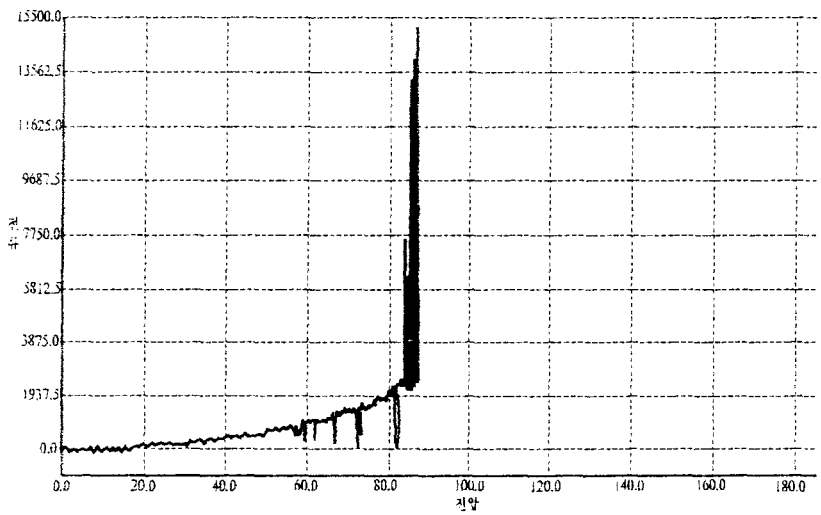

That is, if the interval between the end portion of the second discharge induction conductor electrode 720 and the end portion of the needle electrode member 600 is within the range of 9~13 mm, the insulation breakdown voltage can be minimized in comparison with reference examples 1 and 2 of the prior art as shown in FIG. 4.

Herein, FIG. 4 is a graph showing the relation between the corona discharge current of a generally known lightning arrester and voltages, wherein the insulation breakdown voltage corresponds to 90~110 kV and the discharge current approximately corresponds to 2300~2500 A.

As described hereinabove, in the active lightning arrester according to the present invention, the discharge induction conductor electrode 700 is arranged to carry out the leading discharge together with the needle electrode member 600 such that the leading discharge for corona discharge is generated between the needle electrode member 600 and the second discharge induction conductor electrode 720 of the discharge induction conductor electrode 700 and the first discharge induction conductor electrode 710 promotes the charging by a thundercloud so as to generate the leading discharge between the needle electrode member 600 and the second discharge induction conductor electrode 720 of the discharge induction conductor electrode 700, thereby rapidly and actively generating the main discharge with respect to the thundercloud in the active lightning arrester.

Hereinabove, the present invention is described with reference to the case where the rod member 200, the charging plates 400, the charging tube 500, the needle electrode member 600, the discharge induction conductor electrode 700 and the electrical conductive parts are made from conductive metal materials such as copper, stainless steel and the like which are metal conductors but not limited thereto.

That is, in the present invention, if the above constituent elements are made from the above-mentioned conductive metal materials, corrosion is possibly generated in the long term use, deteriorating the electrical performance thereof. In particular, if the active lightning arrester according to the present invention is installed in poor conditions such as a marine environment, an industrial complex and the like, the corrosion of the conductive metallic parts can be accelerated.

Further, considering that the active lightning arrester according to the present invention is a heavy body of several kilograms or more, using the conductive metal materials can make the installing construction, conveying thereof and the like difficult.

According to another embodiment of the present invention, in order to solve the problems in the corrosion and the installing construction and the like, the rod member 200, the charging plates 400, the charging tube 500, the needle electrode member 600, the discharge induction conductor electrode 700 and the like can be made from carbon or graphite (CARBON & GRAPHITE) which is lightweight more than the metal conductors but still can maintain the electric conductivity similar to that of the metal conductors.

The carbon or graphite used in the present invention is produced and commercialized by a well-known method in the art and, for example, the graphite and the like for discharge of DongKyung Carbon Company (see http://www.dkcarbon.com/tech/tech_01.htm, 2003) is mechanically processed and used, of which the specific explanation thereof is omitted herein.

Herein, the corona discharge is a kind of the leading discharge generated in a non-uniform electric field and refers to the discharge, wherein ambient gas is locally ionized only at a portion where electric fields are concentrated, generating plasma and emitting light.

Therefore, the active lightning arrester according to the present invention generates a discharge path between a thundercloud and the ground, thereby more effectively and safely discharging the charges of the thundercloud to the ground.

Further, even though the polymer insulators are described to be used for the electric insulation hereinabove in order to simplify the description of the present invention, it is also possible to substitute the polymer insulators with various any other insulators such as the porcelain insulators, insulators made from polymer compounds such as synthetic resin, and the like which are well-known in the art.

As described above, while the present invention has been particularly shown and described with reference to the examplary embodiments thereof, the present invention is not limited to the explanation of the embodiments and it should be also understood that all modifications, changes and equivalences within the technical scope of the present invention defined by the following claims belong to the technical scope of the present invention.

BRIEF EXPLANATION OF REFERENCE SYMBOL

100: fixing plate
200: rod member
300: polymer insulators
310: upper polymer insulator
311, 312: extension piece
320: lower polymer insulator
321, 322, 323: extension pieces
330: insulating tube
340: insulating protrusion
400: charging plates
500: charging tube
600: needle electrode member
610: needle-shaped part
700: discharge induction conductor electrode
710: first discharge induction conductor electrode
720: second discharge induction conductor electrode

What is claimed is:

1. An active lightning arrester, comprising:
   a fixing plate provided to the uppermost end part of a protection object and connected to a ground means;
   a rod member coupled to the ground means at one end in the longitudinal direction and charged with charges of the ground;
   a plurality of insulators provided to be spaced from each other in the longitudinal direction of the rod member;
   charging plates provided between the neighboring insulators separately from the rod member so as to be electrically insulated and charged with a polarity opposite to that of the charges of the ground;
   a charging tube provided between the charging plates and the insulators, electrically connected to the charging plates, and charged with charges having a polarity opposite to that of the charges of the ground;
   a needle electrode member provided to the upper end of the rod member and having a needle-shaped part; and
   a discharge induction conductor electrode electrically connected to the charging plates between the insulators and the charging plates so as to induce discharge between the needle electrode member and the discharge induction conductor electrode and emit ion charges through the discharge to atmosphere, thereby forming a discharge path between a thundercloud and the needle electrode.

2. The active lightning arrester according to claim 1, wherein the rod member, the charging plates, the charging tube, the needle electrode member and the discharge induction conductor electrode are made from a carbon or graphite material.

3. The active lightning arrester according to claim 1, wherein any one of the rod member, the charging plates, the charging tube, the needle electrode member and the discharge induction conductor electrode are made from a carbon or graphite material.

4. The active lightning arrester according to claim 1, wherein the discharge induction conductor electrode is divided into two parts, of which one is to be a first discharge induction conductor electrode extending upwards and the other end is to be a second discharge induction conductor electrode folded downwards and positioned in the proximity of the end portion of the needle-shaped part of the needle electrode member.

5. The active lightning arrester according to claim 4, wherein a gap between the end portion of the needle electrode member and the end portion of the second discharge induction conductor electrode is within the range of 9~13 mm.

6. The active lightning arrester according to claim 1, wherein the insulators include an upper insulator provided at the upper portion of the charging tube so as to secure an insulation distance with respect to the needle electrode member and a lower insulator provided at the lower portion of the charging tube so as to secure an insulation distance with respect to the fixing plate and having an insulating protrusion formed at the upper end of the lower insulator so as to be inserted into the charging tube.

7. The active lightning arrester according to claim 6, wherein the insulating protrusion has a structure, in which a plurality of conical members having narrow upper portions and wide lower portions are continuously connected on a same line.

\* \* \* \* \*